US009620964B2

(12) United States Patent
Terao

(10) Patent No.: US 9,620,964 B2
(45) Date of Patent: Apr. 11, 2017

(54) POWER TRANSMISSION SYSTEM AND METHOD, POWER TRANSMITTING APPARATUS AND POWER RECEIVING APPARATUS

(75) Inventor: Kyoichi Terao, Kanagawa (JP)

(73) Assignee: PIONEER CORPORATION, Kanagawa (JP)

( * ) Notice: Subject to any disclaimer, the term of this patent is extended or adjusted under 35 U.S.C. 154(b) by 200 days.

(21) Appl. No.: 14/402,109

(22) PCT Filed: May 23, 2012

(86) PCT No.: PCT/JP2012/063209
§ 371 (c)(1),
(2), (4) Date: Nov. 19, 2014

(87) PCT Pub. No.: WO2013/175596
PCT Pub. Date: Nov. 28, 2013

(65) Prior Publication Data
US 2015/0303701 A1 Oct. 22, 2015

(51) Int. Cl.
*H01F 37/00* (2006.01)
*H02J 17/00* (2006.01)
(Continued)

(52) U.S. Cl.
CPC .............. *H02J 5/005* (2013.01); *B60L 11/182* (2013.01); *G01S 17/87* (2013.01); *H02J 7/025* (2013.01);
(Continued)

(58) Field of Classification Search
CPC .. H02J 5/005; H02J 50/60; H02J 50/90; H02J 7/025; H02J 17/00; B60L 11/182; G01S 17/87; G01V 3/10; G01V 8/12
(Continued)

(56) References Cited

U.S. PATENT DOCUMENTS

2008/0297107 A1  12/2008  Kato et al.
2009/0224723 A1  9/2009  Tanabe

FOREIGN PATENT DOCUMENTS

JP     63-005289     1/1988
JP     2003-098265   4/2003
(Continued)

OTHER PUBLICATIONS

International Search Report PCT/JP2012/063209 dated Aug. 14, 2012.

*Primary Examiner* — Hal Kaplan
(74) *Attorney, Agent, or Firm* — Young & Thompson

(57) ABSTRACT

A power transmission system (1, 2) is provided with a power transmitting apparatus (11, 12, 13) having a power transmission coil (101) and a power receiving apparatus (21, 22) having a power reception coil (201) disposed at a distance from the power transmission coil, and transmits and receives electric power in a wireless manner between the power transmission coil and the power reception coil. The power transmission system is provided with: a foreign body detecting device (106, 206) configured to detect a foreign body positioned in surroundings of the power transmission coil and the power reception coil and detect a relative position of the detected foreign body to the power transmission coil or the power reception coil; and a power controlling device (104) configured to control the power transmitting apparatus to control the transmitted and received electric power according to the detected relative position.

5 Claims, 11 Drawing Sheets

(51) Int. Cl.
    *H02J 5/00* (2016.01)
    *G01S 17/87* (2006.01)
    *H02J 7/02* (2016.01)
    *B60L 11/18* (2006.01)
    *H02J 50/90* (2016.01)
    *H02J 50/60* (2016.01)
    *G01V 3/10* (2006.01)
    *G01V 8/12* (2006.01)
    *G01S 15/87* (2006.01)

(52) U.S. Cl.
    CPC .............. *H02J 17/00* (2013.01); *H02J 50/60* (2016.02); *H02J 50/90* (2016.02); *G01S 15/87* (2013.01); *G01V 3/10* (2013.01); *G01V 8/12* (2013.01)

(58) Field of Classification Search
    USPC ......................................................... 307/104
    See application file for complete search history.

(56) References Cited

FOREIGN PATENT DOCUMENTS

| | | |
|---|---|---|
| JP | 2006-258465 | 9/2006 |
| JP | 2008-295274 | 12/2008 |
| JP | 2009-219177 | 9/2009 |
| JP | 2009-240139 | 10/2009 |
| JP | 2011-120410 | 6/2011 |

Electric energy:
1kWh

Electric energy:
3kWh

| Direction viewed from coil | Transmitted power | Distance to guideline from coil |
|---|---|---|
| North | 1kW | 10cm |
| ... | ... | ... |
| North | 3kW | 30cm |
| Northeast | 1kW | 9cm |
| ... | ... | ... |

| Direction viewed from coil | Transmitted power | Coil-to-coil gap length | Distance to guideline from coil |
|---|---|---|---|
| North | 3kW | 5cm | 20cm |
| | | ... | ... |
| | | 10cm | 30cm |
| | | ... | ... |
| | | 15cm | 35cm |
| ... | ... | ... | ... |

FIG. 6(a) Without foreign body
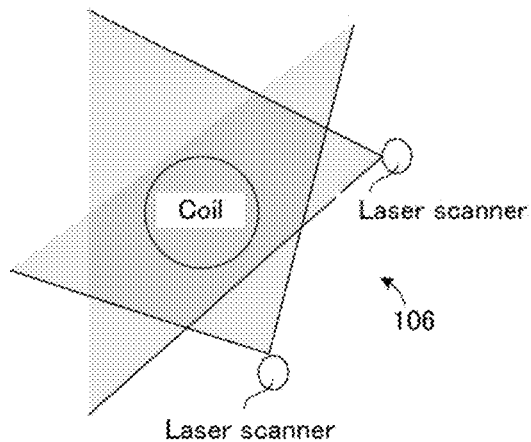
FIG. 6(b) With foreign body
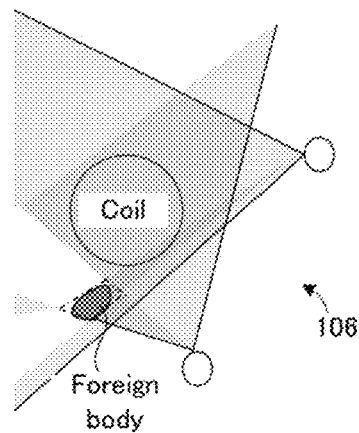
Output example of PD light receiver
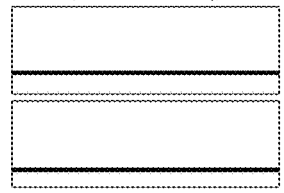
Output example of PD light receiver
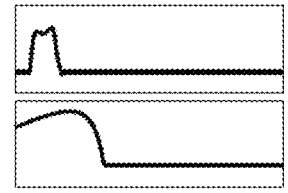
FIG. 7(a)
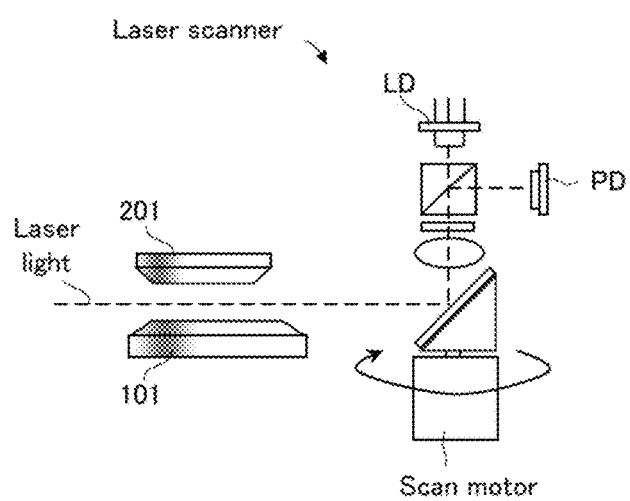
FIG. 7(b)
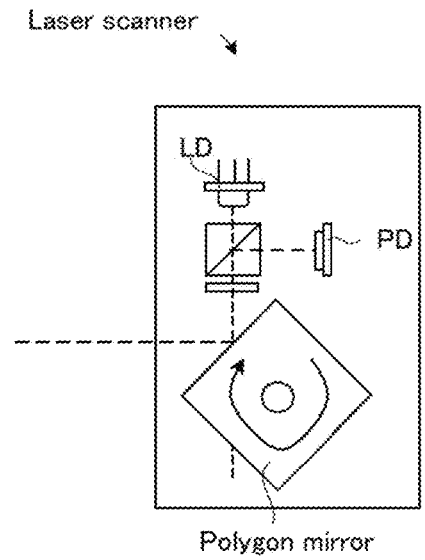

FIG. 8(a) Without foreign body
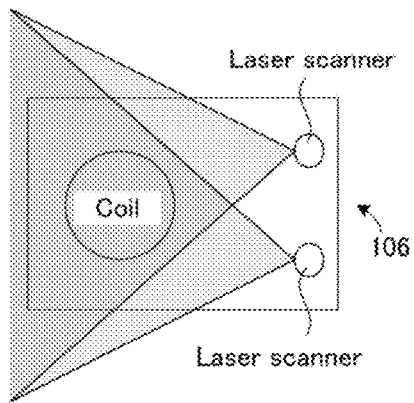
Output example of PD light receiver
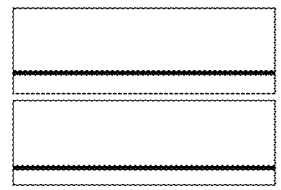
FIG. 8(b) With foreign body
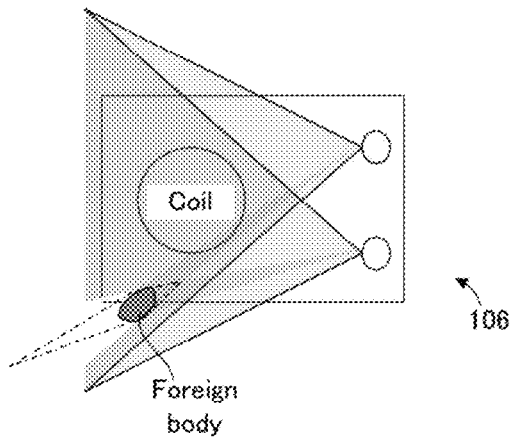
Output example of PD light receiver
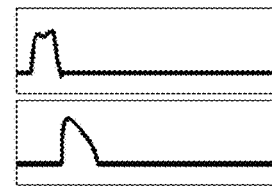

FIG. 9(a) Without foreign body
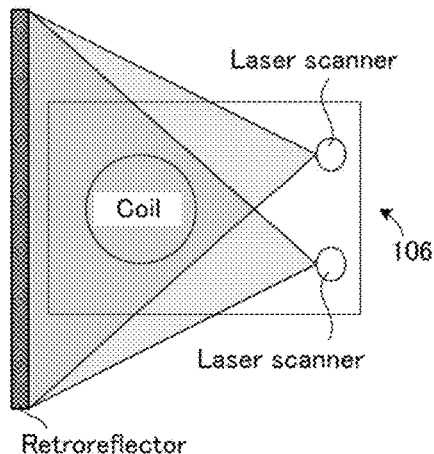
FIG. 9(b) With foreign body
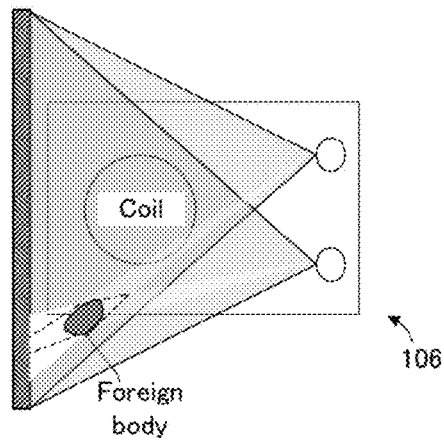
Output example of PD light receiver
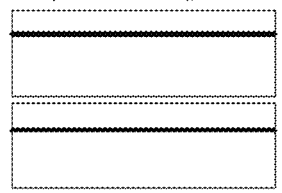
Output example of PD light receiver
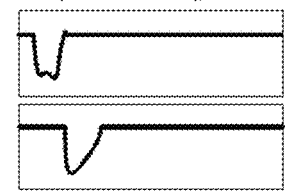
FIG. 10(a) Without foreign body
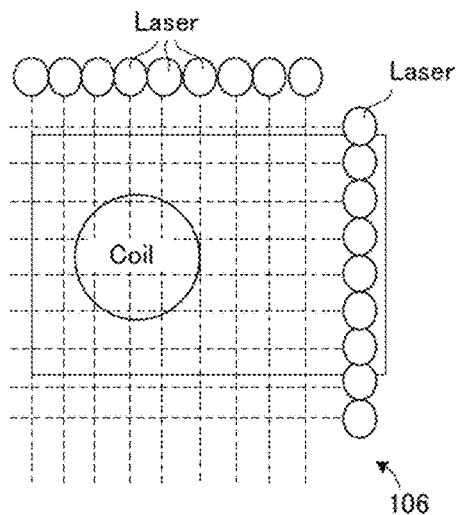
FIG. 10(b) With foreign body
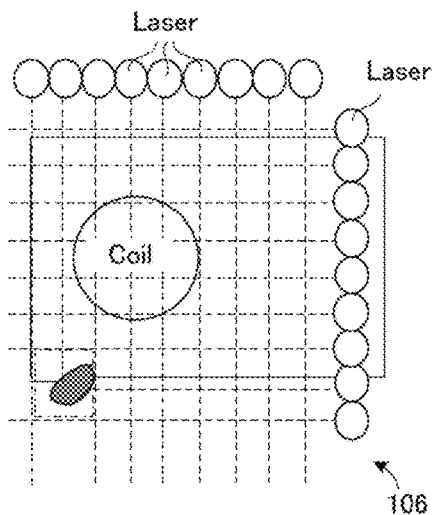

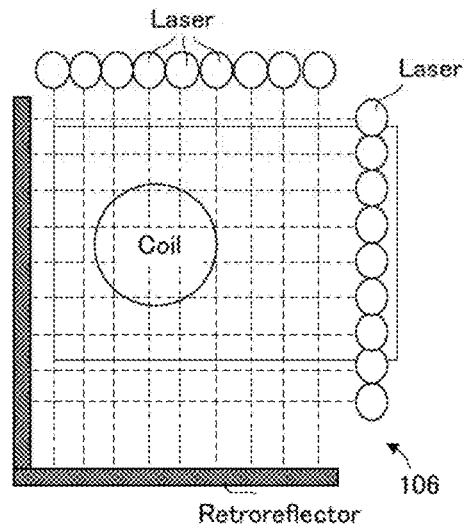
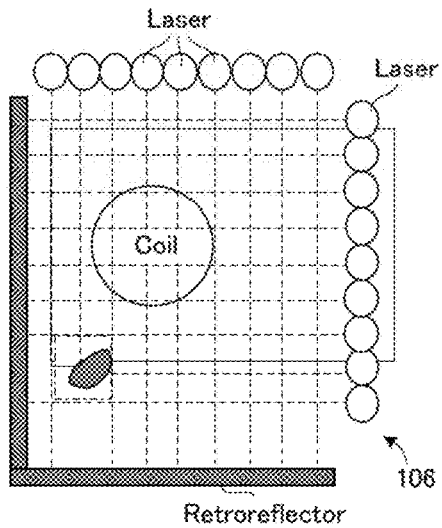
FIG. 11(a) Without foreign body
FIG. 11(b) With foreign body
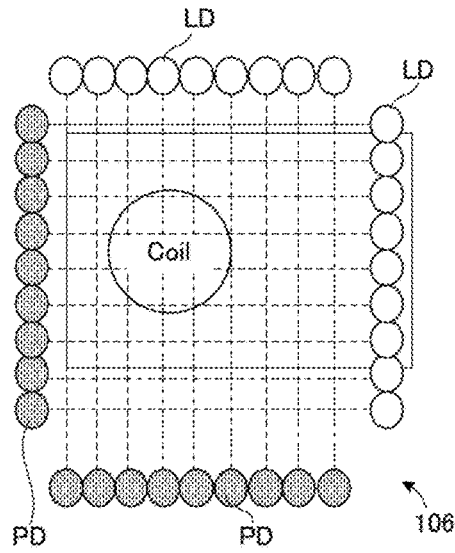
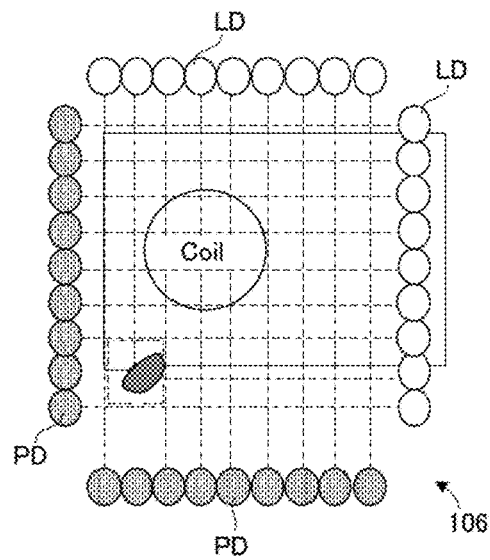
FIG. 12(a) Without foreign body
FIG. 12(b) With foreign body FIG. 13(a) Without foreign body
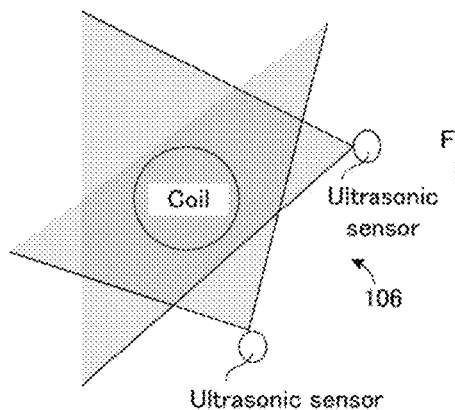
FIG. 13(b) With foreign body
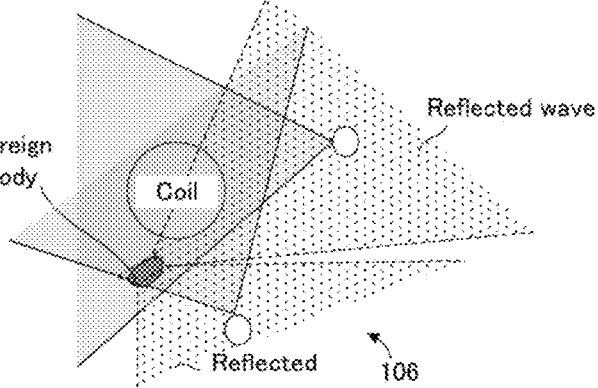
Ultrasonic wave detection example
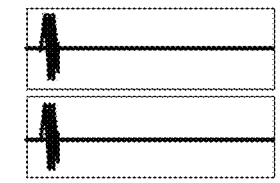
Transmission
Ultrasonic wave detection example
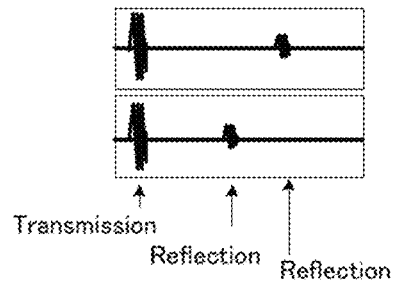
Transmission
Reflection Reflection
FIG. 14
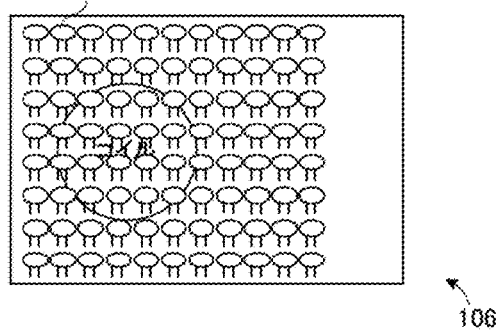

FIG. 15(a) Without foreign body
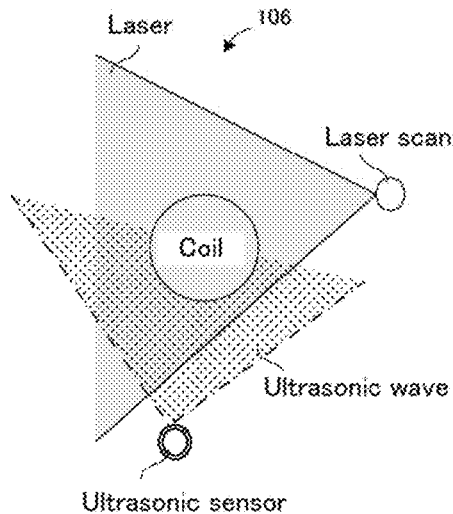
FIG. 15(b) With foreign body
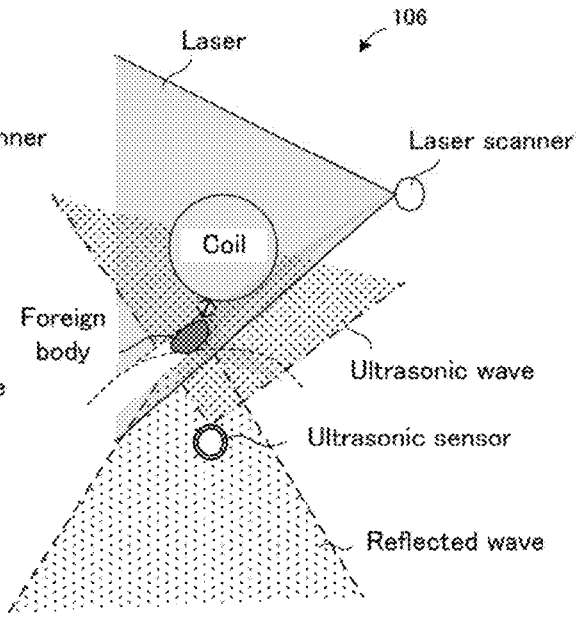
FIG. 16
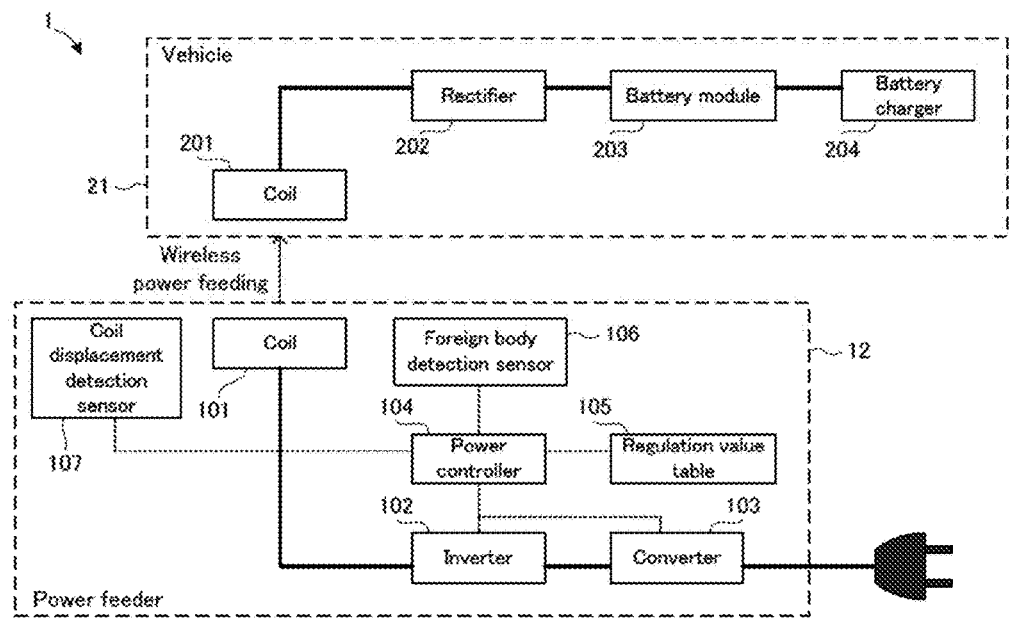

POWER TRANSMISSION SYSTEM AND METHOD, POWER TRANSMITTING APPARATUS AND POWER RECEIVING APPARATUS

TECHNICAL FIELD

The present invention relates to a power transmission system and method which transmit and receive electric power in a wireless manner, and a power transmitting apparatus and a power receiving apparatus which constitute the power transmission system.

BACKGROUND ART

In this type of system, radio wave protection guidelines such as, for example, guidelines of international commission on non-ionizing radiation protection (ICNIRP) are complied with. For example, Patent literature 1 describes a system configured to determine whether or not there is a human in an indoor space, and supply electric power low enough not to influence a human body if it is determined that there is a human in the indoor space, while supplying high electric power if it is determined that there is no human in the indoor space.

CITATION LIST

Patent Literature

Patent Literature 1: Japanese Patent Application Laid Open No. 2009-240139

SUMMARY OF INVENTION

Technical Problem

The aforementioned background art, however, premises indoor use, and is not suitable for outdoor use, which is technically problematic. Moreover, the supplied electric power is reduced only because there is a human in the indoor space without consideration of a distance between a power supply source and the human, and it is possibly hard to perform efficient power supply, which is also technical problematic.

It is therefore an object of the present invention to provide a power transmission system and method, a power transmitting apparatus and a power receiving apparatus which can perform the efficient power supply while complying with the radio wave protection guidelines.

Solution to Problem

The above object of the present invention can be achieved by a power transmission system provided with a power transmitting apparatus having a power transmission coil and a power receiving apparatus having a power reception coil disposed at a distance from the power transmission coil, and configured to transmit and receive electric power in a wireless manner between the power transmission coil and the power reception coil, said power transmission system is provided with: a foreign body detecting device configured to detect a foreign body positioned in surroundings of the power transmission coil and the power reception coil and detect a relative position of the detected foreign body to the power transmission coil or the power reception coil; and a power controlling device configured to control the power transmitting apparatus to control the transmitted and received electric power according to the detected relative position.

The above object of the present invention can be achieved by a power transmission method in a power transmission system provided with a power transmitting apparatus having a power transmission coil and a power receiving apparatus having a power reception coil disposed at a distance from the power transmission coil, and configured to transmit and receive electric power in a wireless manner between the power transmission coil and the power reception coil, said power transmission method is provided with: a foreign body detecting process of detecting a foreign body positioned in surroundings of the power transmission coil and the power reception coil and detecting a relative position of the detected foreign body to the power transmission coil or the power reception coil; and a power controlling process of controlling the power transmitting apparatus to control the transmitted and received electric power according to the detected relative position.

The above object of the present invention can be achieved by a power transmitting apparatus in a power transmission system provided with said power transmitting apparatus having a power transmission coil and a power receiving apparatus having a power reception coil disposed at a distance from the power transmission coil, and configured to transmit and receive electric power in a wireless manner between the power transmission coil and the power reception coil, said power transmitting apparatus is provided with: a foreign body detecting device configured to detect a foreign body positioned in surroundings of the power transmission coil and the power reception coil and detect a relative position of the detected foreign body to the power transmission coil; and a power controlling device configured to control the transmitted and received electric power according to the detected relative position.

The above object of the present invention can be achieved by a power receiving apparatus in a power transmission system provided with a power transmitting apparatus having a power transmission coil and said power receiving apparatus having a power reception coil disposed at a distance from the power transmission coil, and configured to transmit and receive electric power in a wireless manner between the power transmission coil and the power reception coil, said power transmitting apparatus is provided with: a foreign body detecting device configured to detect a foreign body positioned in surroundings of the power transmission coil and the power reception coil and detect a relative position of the detected foreign body to the power reception coil; and a transmitting device configured to transmit a signal indicating the detected relative position to the power transmitting apparatus.

The operation and other advantages of the present invention will become more apparent from embodiments and examples explained below.

BRIEF DESCRIPTION OF DRAWINGS

FIG. 5 are conceptual diagrams illustrating one example of a regulation value table in the first example.

FIG. 6 are conceptual diagrams illustrating a first specific example of a foreign body detection sensor in the first example.

FIG. 7 are block diagrams illustrating a configuration of a laser scanner in the first specific example of the foreign body detection sensor in the first example.

FIG. 8 are conceptual diagrams illustrating a first modified example of the first specific example of the foreign body detection sensor in the first example.

FIG. 9 are conceptual diagrams illustrating a second modified example of the first specific example of the foreign body detection sensor in the first example.

FIG. 10 are conceptual diagrams illustrating a second specific example of the foreign body detection sensor in the first example.

FIG. 11 are conceptual diagrams illustrating a first modified example of the second specific example of the foreign body detection sensor in the first example.

FIG. 12 are conceptual diagrams illustrating a second modified example of the second specific example of the foreign body detection sensor in the first example.

FIG. 13 are conceptual diagrams illustrating a third specific example of the foreign body detection sensor in the first example.

FIG. 14 is a conceptual diagram illustrating a fourth specific example of the foreign body detection sensor in the first example.

FIG. 15 are conceptual diagrams illustrating a fifth specific example of the foreign body detection sensor in the first example.

FIG. 16 is a block diagram illustrating a configuration of a power transmission system in a first modified example of the first example.

DESCRIPTION OF EMBODIMENTS

Figure 1:
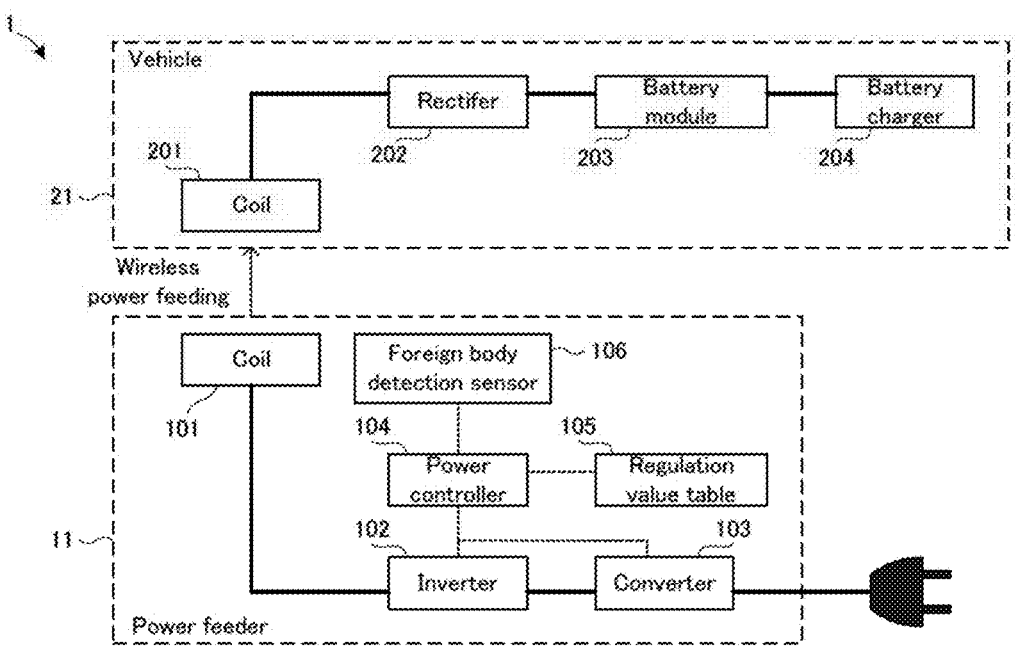
FIG. 1 is a block diagram illustrating a configuration of a power transmission system in a first example.

Embodiments of the power transmission system, the power transmitting apparatus and the power receiving apparatus of the present invention will be explained.
(Embodiment of Power Transmission System)

The power transmission system in the embodiment is a power transmission system provided with a power transmitting apparatus having a power transmission coil and a power receiving apparatus having a power reception coil disposed at a distance from the power transmission coil, and configured to transmit and receive electric power in a wireless manner between the power transmission coil and the power reception coil, said power transmission system is provided with: a foreign body detecting device configured to detect a foreign body positioned in surroundings of the power transmission coil and the power reception coil and detect a relative position of the detected foreign body to the power transmission coil or the power reception coil; and a power controlling device configured to control the power transmitting apparatus to control the transmitted and received electric power according to the detected relative position.

The power transmission system is provided with the power transmitting apparatus having the power transmission coil, and the power receiving apparatus having the power reception coil disposed at the distance from the power transmission coil. The power transmitting apparatus and the power receiving apparatus transmit and receive the electric power in the wireless manner, for example, by electromagnetic induction, magnetic resonance or the like. Various known aspects can be applied to a technology of the wireless power transmission, and thus, an explanation of the details thereof is omitted here.

The foreign body detecting device detects the foreign body positioned in the surroundings of the power transmission coil and the power reception coil, and detects the relative position of the detected foreign body to the power transmission coil or the power reception coil. The "relative position of the detected foreign body to the power transmission coil or the power reception coil" may be a relative position of the detected foreign body to the outer edge of the power transmission coil or the outer edge of the power reception coil, or may be a relative position of the detected foreign body to the center of the power transmission coil or the center of the power reception coil The relative position may be expressed, for example, by a distance between the detected foreign body and the power transmission coil or the power reception coil, and a direction. In this case, the direction may be expressed as in front, back, left and right of the power receiving apparatus (e.g. a vehicle), or the like. Alternatively, the direction may be expressed as north, south, east and west of a case or housing of the power transmitting apparatus, or the like.

The power controlling device, which is provided, for example, with a memory, a processor, and the like, controls the power transmitting apparatus to change the electric power transmitted and received between the power transmitting apparatus and the power receiving apparatus, according to the detected relative position. Specifically, for example, the power controlling device controls the power transmitting apparatus to change to the electric power that a magnetic flux density at the position of the foreign body (i.e. the detected relative position) is less than a value determined by the radio wave protection guidelines.

A relation between the output power of the power transmitting apparatus and the magnetic flux density at an arbitrary position may be obtained by measuring the magnetic flux density at the arbitrary position by using a magnetic flux measurement unit before the power transmission by the power transmission system. Then, a data table which determines a relation between the position of the foreign body and electric energy may be stored in the power controlling device in advance, and the electric energy may be specified by the data table and the relative position detected by the foreign body detecting device. The power controlling device may be configured to control the power transmitting device to set the specified electric energy.

According to the study of the present inventors, the following has been found. If the power transmission system is used to charge a battery mounted on, for example, an electric vehicle or the like, a charging period of the battery between a discharged state and a fully charged state is relatively long such as, for example, eight hours. In addition, for example, if there is a human in the surrounding of the power transmission coil and the power reception coil during the charging period, the charging needs to be temporally stopped to avoid an influence on a human body. It is then necessary to perform a process for stopping the charging and a process for restarting the charging, which makes the charging period even longer.

In the embodiment, however, as described above, the power transmitting apparatus is controlled by the power controlling device to change the electric power transmitted and received between the power transmitting apparatus and the power receiving apparatus according to the detected relative position. In other words, in the embodiment, it is not the stop of the transmission and reception of the electric power but the change in the electric power. The process such as, for example, the stopping process is thus not performed, and it is possible to prevent that the charging period unnecessarily becomes long due to the detection of the foreign body. In addition, the electric power is changed according to the relative position detected by the foreign body detecting device. It is thus possible to appropriately change the electric power in comparison with a case where the electric power is reduced simply because the foreign body is detected. Therefore, according to the embodiment, it is possible to perform the efficient power supply while complying with the radio wave protection guidelines.

Particularly in the embodiment, the relative position of the detected foreign body to the power transmission coil or the power reception coil is detected. It is thus possible to appropriately change the electric power, for example, even if the shape of the coils and the shape of a magnetic field generated in the surroundings of the coils are different from each other (specifically, if the coils are in a polygonal shape and the magnetic field is a perfect circle shape, or in similar cases.

The power controlling device is typically mounted on the power transmitting apparatus. The foreign body detecting device may be mounted on either the power transmitting apparatus or the power receiving apparatus. If the foreign body detecting device is mounted on the power receiving apparatus, the power receiving apparatus transmits to the power transmitting apparatus a signal indicating the relative position detected by the foreign body detecting device. The power controlling device mounted on the power transmitting apparatus which receives the transmitted signal controls the power transmitting apparatus to change the transmitted and received electric power according to the relative position indicated by the received signal.

Moreover, the gap between the power transmission coil and the power reception coil may be changed such that the magnetic flux density at the position of the detected foreign body is less than the value determined by the radio wave protection guidelines, without changing the electric power supplied to the power transmission coil. Since the gap is changed, the electric power transmitted and received between the power transmission coil and the power reception coil is changed (or a range of the magnetic flux density at the value determined by the radio wave protection guidelines to the coil(s) is changed: specifically, refer to FIG. 17(a) described later).

(Embodiment of Power Transmission Method)

The power transmission method in the embodiment is a power transmission method in a power transmission system provided with a power transmitting apparatus having a power transmission coil and a power receiving apparatus having a power reception coil disposed at a distance from the power transmission coil, and configured to transmit and receive electric power in a wireless manner between the power transmission coil and the power reception coil, said power transmission method is provided with: a foreign body detecting process of detecting a foreign body positioned in surroundings of the power transmission coil and the power reception coil and detecting a relative position of the detected foreign body to the power transmission coil or the power reception coil; and a power controlling process of controlling the power transmitting apparatus to control the transmitted and received electric power according to the detected relative position.

According to the power transmission method in the embodiment, it is possible to perform the efficient power supply while complying with the radio wave protection guidelines, as in the power transmission system described above.

(Embodiment of Power Transmitting Apparatus)

The power transmitting apparatus in the embodiment is a power transmitting apparatus in a power transmission system provided with said power transmitting apparatus having a power transmission coil and a power receiving apparatus having a power reception coil disposed at a distance from the power transmission coil, and configured to transmit and receive electric power in a wireless manner between the power transmission coil and the power reception coil, said power transmitting apparatus is provided with: a foreign body detecting device configured to detect a foreign body positioned in surroundings of the power transmission coil and the power reception coil and detect a relative position of the detected foreign body to the power transmission coil; and a power controlling device configured to control the transmitted and received electric power according to the detected relative position.

According to the power transmitting apparatus in the embodiment, it is possible to perform the efficient power supply while complying with the radio wave protection guidelines, as in the power transmission system described above.

(Embodiment of Power Receiving Apparatus)

The power receiving apparatus in the embodiment is a power receiving apparatus in a power transmission system provided with a power transmitting apparatus having a power transmission coil and said power receiving apparatus having a power reception coil disposed at a distance from the power transmission coil, and configured to transmit and receive electric power in a wireless manner between the power transmission coil and the power reception coil, said power transmitting apparatus is provided with: a foreign body detecting device configured to detect a foreign body positioned in surroundings of the power transmission coil and the power reception coil and detect a relative position of the detected foreign body to the power reception coil; and a transmitting device configured to transmit a signal indicating the detected relative position to the power transmitting apparatus.

The signal indicting the relative position detected by the foreign body detecting device is transmitted from the power receiving apparatus to the power transmitting apparatus. Thus, if the power transmitting apparatus is configured to control the electric power according to the relative position indicated by the transmitted signal, then, it is possible to perform the efficient power supply while complying with the radio wave protection guidelines.

EXAMPLES

Examples of the power transmission system of the present invention will be explained with reference to the drawings.

First Example

A first example of the power transmission system of the present invention will be explained with reference to FIG. 1 to FIG. 15. FIG. 1 is a block diagram illustrating a configuration of the power transmission system in the first example.

In FIG. 1, a power transmission system 1 is provided with a power feeder 11 as one example of the "power transmitting apparatus" of the present invention, and a vehicle 21 as one example of the "power receiving apparatus" of the present invention.

The power feeder 11 is provided with a power transmission coil 101, an inverter 102, a converter 103, a power controller 104, a regulation value table 105, and a foreign body detection sensor 106. In operation of the power feeder 11, alternating current (AC) power supplied from the exterior is converted to direct current (DC) power by the converter 103, and the converted DC power is converted to AC power having a frequency suitable for wireless power feeding by the inverter 102 and is supplied to the power transmission coil 101.

The vehicle 21 is provided with a power reception coil 201, a rectifier 202, a battery module 203 and a battery charger 204. When electric power is supplied from the power feeder 11, AC power received by the power reception coil 201 is converted to DC power by the rectifier 202, and the converted DC power is supplied to the battery charger 204 via the battery module 203.

Various known aspects can be applied to the wireless power feeding, and thus, an explanation of the details thereof is omitted.

By the way, in the wireless power feeding, due to a predetermined gap between the power transmission coil 101 and the power reception coil 201, a magnetic field is leaked according to electric energy during the power feeding. Specifically, for example, as illustrated in FIG. 2, a leakage range of the magnetic field changes according to the electric energy.

Figure 2A:
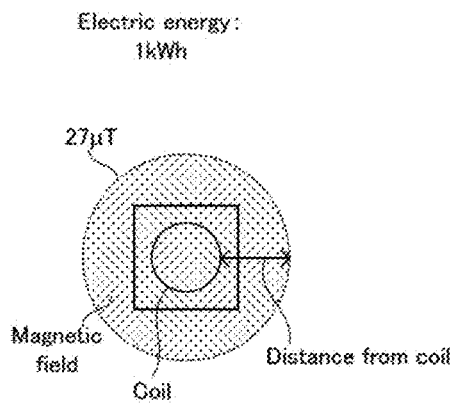
FIG. 2 are conceptual diagrams illustrating one example of a relation between electric energy and a magnetic field.
Figure 2B:
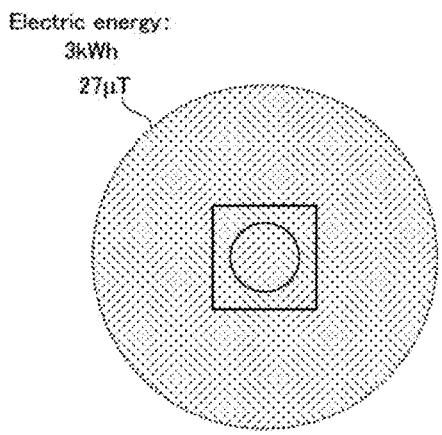

FIG. 2 are conceptual diagrams illustrating one example of a relation between the electric energy and the magnetic field. FIG. 2 illustrate a boundary which is 27 µT (micro tesla) in a dashed line. The magnetic field tends to become stronger as it comes closer to the coil, and tends to become weaker as it becomes distant from the coil.

The charging of a battery mounted on the vehicle such as, for example, an electric vehicle is performed in a place such as a parking space where there are many and unspecified people in the surroundings in many cases. Then, there is a possibility to have an adverse effect on a human body depending on the leakage range of the magnetic field and the strength of the magnetic field. Therefore, in the radio wave protection guidelines such as, for example, ICNIRP, there is determined a guideline regarding general public electromagnetic wave exposure. Specifically, for example, in the latest guideline at the time of the filing of the present invention, 27 µT is set in a frequency range of 3 kHz (kilohertz) to 10 MHz (megahertz).

From a safety viewpoint, the power feeding is desirably stopped if a human approaches the coil during the wireless power feeding. In a relatively high foot traffic area, however, the stop and restart of the power feeding are repeated, relatively frequently, which possibly increases, for example, a time spent on the charging of the battery mounted on the vehicle. This not only makes it extremely hard to improve power feeding efficiency but also possibly makes the system inconvenient for a user.

Moreover, if there are not only a human but also metal such as, for example, an empty can in the surroundings of the coil, the metal is heated by the leakage magnetic field. Then, for example, the power transmission system is possibly influenced by the heated metal.

Thus, in the example, a foreign body (including a human) positioned in the surroundings of the power transmission coil 101 and the power reception coil 201 is detected by the foreign body detection sensor 106. If the foreign body is detected, a relative position of the detected foreign body to the power transmission coil 101 and/or the power reception coil 201 is detected.

Figure 3A:
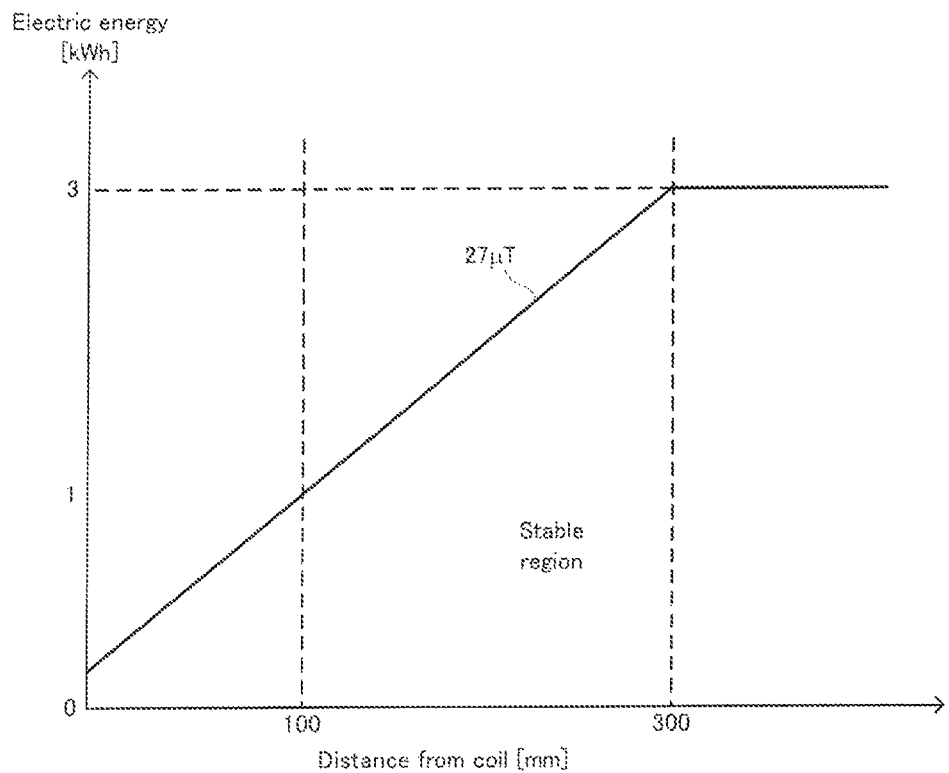
FIG. 3 are characteristic diagrams illustrating one example of a relation between a distance which is a regulation value of the radio wave protection guidelines and the electric energy.
Figures 4, 5A, 5B:
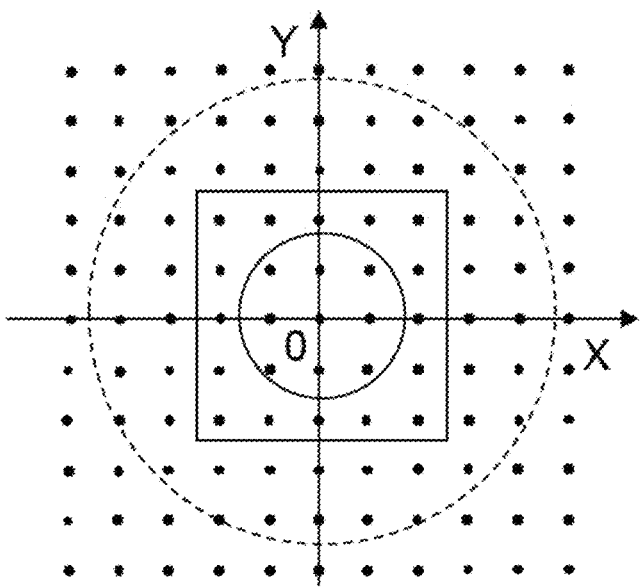
FIG. 4 is a conceptual diagram illustrating a concept of a coordinate point when a coil is viewed in a planar manner.

In the power feeder 11, a data table (corresponding to the "first data table" of the present invention) is stored as the regulation value table 105 in advance (refer to FIG. 5(a)). On the data table, a characteristic diagram indicating a relation between the relative position which is a regulation value of the radio wave protection guidelines (which is "27 µT" herein) and the electric energy is quantified as illustrated in FIG. 3(a). Alternatively, on the data table, a relation between the electric energy and a magnetic flux density for each coordinate point (refer to FIG. 4) is quantified.

Here, on the regulation value table as illustrated in FIG. 5(a), the gap between the power transmission coil 101 and the power reception coil 201 is set as a fixed value, such as, for example, 10 cm. The "transmitted power" in FIG. 5(a) may be set in units of electric power which can be actually changed by the power feeder 11, such as, for example, in units of 0.5 kW. The "direction" in FIG. 5(a) may be expressed not only in the illustrated form of four directions, eight directions, 16 directions or the like based on north, south, east and west, but also in a form of, for example, in front and behind, left and right, or the like.

Figure 3B:
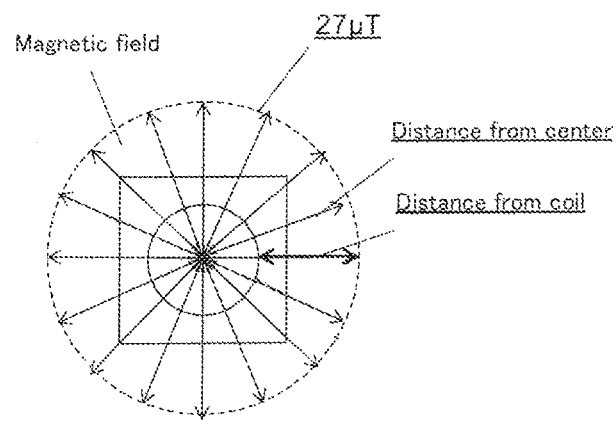

In FIG. 3(a), outputtable maximum electric energy pursuant to laws or regulations is set to, for example, "3 kWh". Of course, the outputtable maximum electric energy varies depending on laws or regulations that must be complied with. Moreover, the characteristics illustrated in FIG. 3(a) also vary depending on the shape of the coil (e.g. circular, rectangular, polygonal, star-shaped, etc.). The characteristic diagram illustrated in FIG. 3(a) may be set for each direction (refer to FIG. 3(b)).

The power controller 104 controls the inverter 102 to change the electric power supplied to the power transmission coil 101, according to the detected relative position. Specifically, for example, the power controller 104 specifies electric energy which can be outputted from the regulation value table 105 on the basis of the detected relative position, and controls the inverter 102 and the converter 103 to supply the specified electric energy to the power transmission coil 101.

As a result, in the power transmission system 1 in the example, it is possible to perform the wireless power feeding while complying with the radio wave protection guidelines to ensure safety. In addition, the power feeding is not completely stopped even if the foreign body is detected. It is therefore possible to reduce a time spent on, for example, a power feeding stop process, a power feeding restart process or the like, thereby improving the power feeding efficiency.

The "power controller 104", the "regulation value table 105" and the "foreign body detection sensor 106" in the example are one example of the "power controlling device", the "first data table" and the "foreign body detecting device" of the present invention, respectively.

(First Specific Example of Foreign Body Detection Sensor)

Next, a first specific example of the foreign body detection sensor 106 will be explained with reference to FIG. 6 and FIG. 7. FIG. 6 are conceptual diagrams illustrating the first specific example of the foreign body detection sensor in the first example. FIG. 7 are block diagrams illustrating a configuration of a laser scanner in the first specific example of the foreign body detection sensor in the first example.

The foreign body detection sensor 106 is provided with a plurality of laser scanners (refer to FIG. 6). As illustrated in FIG. 7(*a*), the laser scanner is provided, for example, with a laser diode LD, a photodiode PD, a scan motor configured to rotate a mirror, and the like. Alternatively, as illustrated in FIG. 7(*b*), the laser scanner is provided, for example, with a laser diode LD, a photodiode PD, a polygon mirror, and the like.

If there is no foreign body in the surroundings of the power transmission coil 101 and the power reception coil 201, there is relatively little return light. Therefore, as illustrated in a lower part of FIG. 6(*a*), there is no signal level outputted from the photodiode PD. On the other hand, if there is a foreign body in the surroundings of the power transmission coil 101 and the power reception coil 201, there is a peak in a signal outputted from the photodiode PD, as illustrated in a lower part of FIG. 6(*b*). The return light is reflected light caused by the scattering of laser light by the foreign body, and thus has an extremely small level.

If the foreign body is detected, the foreign body detection sensor 106 detects an existence range of the foreign body from the photodiode PD, for example, on the basis of the signal outputted from the photodiode PD, and detects the relative position of the detected foreign body to the power transmission coil 101 and/or the power reception coil 201 on the basis of a position of the photodiode PD and a position of the power transmission coil 101 and/or a position of the power reception coil 201. Various known aspects can be applied to a method of obtaining the existence range and the relative position of the foreign body, and thus, an explanation of the details thereof is omitted.

Moreover, a distance between the laser scanner and the foreign body can be measured on the basis of a time difference between a time of light emission from the laser diode LD and a time of light reception by the photodiode PD. It is therefore possible to improve accuracy of detecting the position of the foreign body by using the measured value. Various known aspects can be applied to a specific method, and thus, an explanation of the details thereof is omitted.

The relative position of the detected foreign body to the power transmission coil 101 and/or the power reception coil 201 may be detected as a relative position corresponding to a position with the highest leakage magnetic field amount in the detected existence range of the foreign body.

The laser scanners may be arranged, for example, as illustrated in FIG. 8 in addition to the arrangement illustrated in FIG. 6. FIG. 8 are conceptual diagrams illustrating a first modified example of the first specific example of the foreign body detection sensor in the first example.

As illustrated in FIG. 9, the foreign body detection sensor 106 may be further provided with a retroreflector as one example of the "retroreflection member" of the present invention. In this case, if there is a foreign body in the surroundings of the power transmission coil 101 and the power reception coil 201, there is no return light reflected from the retroreflector only in a part in which there is the foreign body, and it is thus possible to specify the position (refer to a lower part of FIG. 9(*b*)). FIG. 9 are conceptual diagrams illustrating a second modified example of the first specific example of the foreign body detection sensor in the first example.

The provision of the retroreflector relatively increases the return light, and thus, a relatively less sensitive, inexpensive photodiode can be used as the photodiode PD of the laser scanner. This results in a reduction in manufacturing cost of the foreign body detection sensor 106, which is extremely useful in practice.

The number of the laser scanners of the foreign body detection sensor 106 may be not limited to two, but may be three or more. With increasing number of the laser scanners, it is possible to further improve the accuracy of detecting the position of the foreign body.

(Second Specific Example of Foreign Body Detection Sensor)

A second specific example of the foreign body detection sensor 106 will be explained with reference to FIG. 10. FIG. 10 are conceptual diagrams illustrating the second specific example of the foreign body detection sensor in the first example.

As illustrated in FIG. 10, the foreign body detection sensor 106 is provided with a plurality of laser apparatuses arranged in one direction, and a plurality of laser apparatuses arranged in another direction crossing the one direction. Various known aspects can be applied to the laser apparatus, and thus, an explanation of the details thereof is omitted.

As illustrated in FIG. 11, the foreign body detection sensor 106 may be further provided with a retroreflector. By virtue of such a configuration, a relatively inexpensive photodiode can be used as a photodiode (not illustrated) of the laser apparatus, resulting in a reduction in manufacturing cost. Incidentally, FIG. 11 are conceptual diagrams illustrating a first modified example of the second specific example of the foreign body detection sensor in the first example.

Alternatively, as illustrated in FIG. 12, the foreign body detection sensor 106 may be provided with laser diodes (LDs) as laser light sources, and photodiodes (PDs) as light receivers, separately. FIG. 12 are conceptual diagrams illustrating a second modified example of the second specific example of the foreign body detection sensor in the first example.

The laser apparatus may be provided as a different member from the power feeder 11, or may be provided as the foreign body detection sensor 106 on the power reception side (i.e. the vehicle) as in a second example described later, or may be as the foreign body detection sensor 106 on both the power feeder 11 and the vehicle 21.

(Third Specific Example of Foreign Body Detection Sensor)

A third specific example of the foreign body detection sensor will be explained with reference to FIG. 13. FIG. 13 are conceptual diagrams illustrating the third specific example of the foreign body detection sensor in the first example.

As illustrated in FIG. 13, the foreign body detection sensor 106 is provided with a plurality of ultrasonic distance sensors. The ultrasonic distance sensor is provided with both a transmission function and a reception function. In order to prevent ultrasonic waves from interfering with each other, ultrasonic distance sensors with different frequencies may be used. Alternatively, the plurality of ultrasonic distance sensors may repeat time division transmission and reception in order, so that the ultrasonic distance sensors do not simultaneously perform the transmission and reception.

If the foreign body detection sensor 106 detects reflected waves, that are obtained by that ultrasonic waves outputted from the ultrasonic distance sensors are reflected by the foreign body (referred to in a lower part of FIG. 13(*b*)), the foreign body detection sensor 106 measures respective distances between the ultrasonic distance sensors and the foreign body, and detects the relative position of the foreign body to the power transmission coil 101 and/or the power reception coil 201 from a position relation between installation positions of the plurality of ultrasonic distance sensors and the power transmission coil 101 and/or the power reception coil 201, and from respective measured values of the plurality of ultrasonic distance sensors. Various known aspects can be applied to a method of detecting the distance by using the ultrasonic waves, and thus, an explanation of the details thereof is omitted.

The number of the ultrasonic distance sensors of the foreign body detection sensor 106 may be not limited to two, but may be three or more. With increasing number of the ultrasonic distance sensors, it is possible to further improve the accuracy of detecting the position of the foreign body.

(Fourth Specific Example of Foreign Body Detection Sensor)

A fourth specific example of the foreign body detection sensor will be explained with reference to FIG. 14. FIG. 14 is a conceptual diagram illustrating the fourth specific example of the foreign body detection sensor in the first example.

As illustrated in FIG. 14, the foreign body detection sensor 106 is provided with a plurality of magnetic flux measurement sensors which are arranged on the ground in the surroundings of the power transmission coil 101, or buried underground, or embedded in the power feeder 11, or embedded on the power reception side (i.e. vehicle) as illustrated in a second example described later. If there is a foreign body, a magnetic flux corresponding to a region in which there is the foreign body is disturbed, and it is thus possible to relatively easily specify the region in which there is the foreign body.

In addition, it is also possible to measure magnetic fluxes in the surroundings of the power transmission coil 101 and the power reception coil 201 in real time. It is therefore only necessary for the power controller 104 to control the inverter 102 and the converter 103 such that the magnetic flux in the region in which there is the foreign body is less than or equal to a regulation value determined by the radio wave protection guidelines, with reference to output of the magnetic flux measurement sensors. As a result, the magnetic flux in the region in which there is the foreign body can be certainly set to be less than or equal to the regulation value, which is extremely useful in practice.

Various known aspects can be applied to the magnetic flux measurement sensor, and thus, an explanation of the details thereof is omitted. By using as many small magnetic flux measurement sensors as possible, it is possible to improve accuracy of specifying the region in which there is the foreign body.

(Fifth Specific Example of Foreign Body Detection Sensor)

A fifth specific example of the foreign body detection sensor will be explained with reference to FIG. 15. FIG. 15 are conceptual diagrams illustrating the fifth specific example of the foreign body detection sensor in the first example.

As illustrated in FIG. 15, the foreign body detection sensor 106 is provided with one laser scanner and one ultrasonic distance sensor. Here, the configuration of the laser scanner is the same as that of the laser scanner illustrated in FIG. 7. Moreover, the ultrasonic distance sensor is provided with both the transmission function and the reception function, as in the aforementioned third specific example.

The foreign body detection sensor 106 detects the presence or absence of the foreign body on the basis of a signal outputted from the photodiode PD of the laser scanner and a signal outputted from a receiver of the ultrasonic distance sensor. At the same time, if the foreign body is detected, the foreign body detection sensor 106 also detects the relative position of the detected foreign body.

The arrangement of the laser scanner and the ultrasonic distance sensor is not limited to the arrangement illustrated in FIG. 15. For example, various arrangements can be adopted, such as arranging the laser scanner and the ultrasonic distance sensor at substantially the same position. Moreover, it is possible to improve the accuracy of detecting the relative position to be detected by increasing the number of at least one of the laser scanner and the ultrasonic distance sensor.

First Modified Example

Next, a first modified example of the power transmission system in the first example will be explained with reference to FIG. 16 and FIG. 17. FIG. 16 is a block diagram illustrating a configuration of a power transmission system in the first modified example of the first example, to the same effect as in FIG. 1. FIG. 17 are conceptual diagrams illustrating one example of a gap or a position shift amount between coils and the magnetic field, to the same effect as in FIG. 2.

In FIG. 16, the power transmission system 1 is provided with a power feeder and the vehicle 21. The power feeder 12 is provided with a coil displacement detection sensor 107, in addition to the power transmission coil 101, the inverter 102, the converter 103, the power controller 104, the regulation value table 105 and the foreign body detection sensor 106.

The coil displacement detection sensor 107 detects a gap between the power transmission coil 101 and the power reception coil 201. In addition, the coil displacement detection sensor 107 detects a position shift amount between the power transmission coil 101 and the power reception coil 201 viewed in a planar manner from above the power transmission coil 101.

Specifically, the coil displacement detection sensor 107 uses, for example, a distance measurement sensor using ultrasonic waves and laser, thereby detecting the gap between the power transmission coil 101 and the power reception coil 201. Moreover, the coil displacement detection sensor 107, for example, analyzes images taken by a camera, thereby detecting the position shift amount between the power transmission coil 101 and the power reception coil 201 viewed in the planar manner from above the power transmission coil 101.

One of the power transmission coil 101 and the power reception coil 201 may be provided with three ultrasonic transmitters with three different frequencies. The other of the power transmission coil 101 and the power reception coil 201 may be provided with an ultrasonic receiver. Then, ultrasonic waves may be transmitted from the three ultrasonic transmitters. The position shift amount may be detected on the basis of arrival times of the three types of transmitted ultrasonic waves at the ultrasonic receiver and an arrival time difference between the arrival times.

As illustrated in FIG. 17, the leakage range of the magnetic field varies depending on the gap between the power transmission coil 101 and the power reception coil 201 and the position shift amount between the power transmission coil 101 and the power reception coil 201 viewed in the planar manner from above the power transmission coil 101.

Particularly if the power reception coil 201 is mounted on the vehicle such as, for example, an electric vehicle, it is hard to steer the vehicle such that the power reception coil 201 and the power transmission coil 101 overlap with each other when being viewed in the planar manner. Vehicle height varies depending on a vehicle type, and it is thus hard to specify the gap between the power transmission coil 101 and the power reception coil 201 if the power feeder is designed for an unspecified vehicle.

Therefore, as in the modified example, it is extremely meaningful in practice that the gap and the position shift amount are detected by the coil displacement detection sensor 107. The wireless power feeding can be performed, more safely, by configuring the power controller 104 to control the inverter 102 and the converter 103 to change the electric power supplied to the power transmission coil 101 according to the relative position detected by the foreign body detection sensor, while correcting the leakage range of the magnetic field, in view of the gap and the position shift amount detected by the coil displacement detection sensor 107.

The "coil displacement detection sensor 107" in the modified example is one example of the "gap detecting device" and the "position shift detecting device" of the present invention.

Second Modified Example

Figure 18:
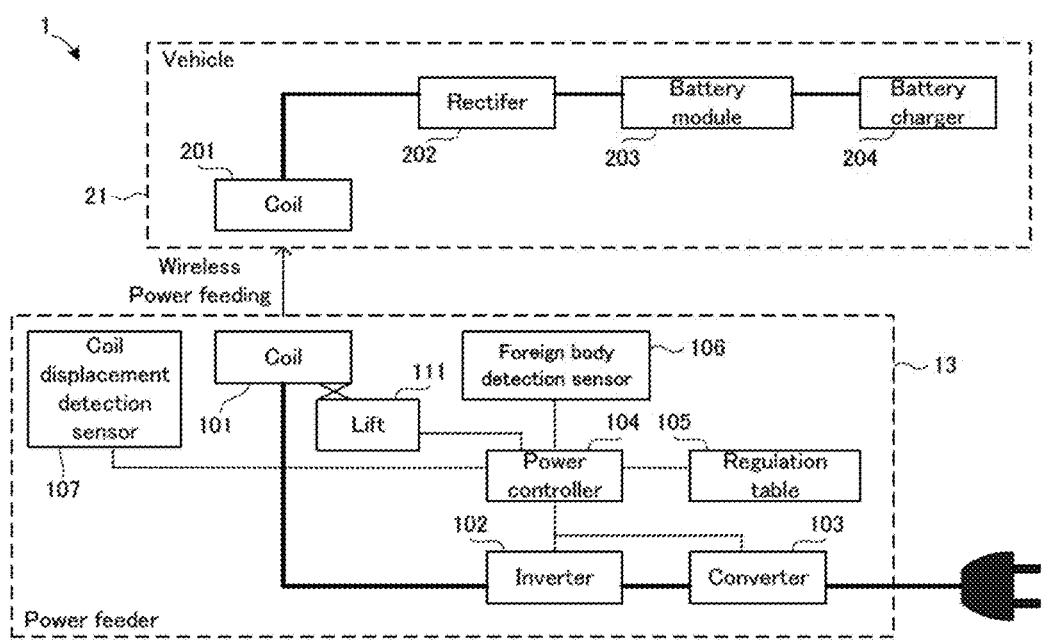
FIG. 18 is a block diagram illustrating a configuration of a power transmission system in a second modified example of the first example.

Next, a second modified example of the power transmission system in the first example will be explained with reference to FIG. 18. FIG. 18 is a block diagram illustrating a configuration of a power transmission system in the second modified example of the first example, to the same effect as in FIG. 1.

In FIG. 18, the power transmission system 1 is provided with a power feeder 13 and a vehicle 21. The power feeder 13 is provided with the power transmission coil 101, the inverter 102, the converter 103, the power controller 104, the regulation value table 105, the foreign body detection sensor 106, the coil displacement detection sensor 107, and a lift 111.

The lift 111 as one example of the "gap changing device" of the present invention is configured to change the gap between the power transmission coil 101 and the power reception coil 201 by moving the power transmission coil 101 in a height direction thereof. The lift 111 may change the gap by changing the height of a part in which wheels of the vehicle 21 are grounded, instead of or in addition to the power transmission coil 101.

In the modified example, a data table (corresponding to the "second data table" of the present invention) is stored as the regulation value table 105 in the power feeder 13 in advance (refer to FIG. 5(b)). Here, the data table determines a relation between the relative position of the foreign body and a gap length which is a length of the gap between the power transmission coil 101 and the power reception coil 201.

Here, the "coil-to-coil gap length" in FIG. 5(b) may be set, for example, in units of 1 cm or the like. Upon reference to the regulation value data table 105, a value corresponding to the "coil-to-coil gap length" which is closest to an actual gap and detected by the coil displacement detection sensor 107 may be referred to. The data table illustrated in FIG. 5(b) includes the data table illustrated in FIG. 5(a).

The data table as described above may be configured such that the magnetic flux density at one position is less than or equal to a value determined by the radio wave protection guidelines, on the basis of a relation between the magnetic flux density at an arbitrary position in the surroundings of the power transmission coil 101 and the gap length, wherein the relation is obtained for each electric power supplied to the power transmission coil 101.

The power controller 104 specifies such a gap length that the magnetic flux density at the position of the foreign body detected is less than or equal to the value determined by the radio wave protection guidelines, from the regulation value table 105, on the basis of the relative position of the foreign body detected by the foreign body detection sensor 106. The power controller 104 then controls the lift 111 to set the specified gap length with reference to the gap detected by the coil displacement detection sensor 107.

At this time, the power controller 104 typically controls the inverter 102 and the converter 103 not to change the electric power supplied to the power transmission coil 101. The power controller 104 may be control the inverter 102 and the converter 103 to change the electric power supplied to the power transmission coil 101.

Figure 17A:
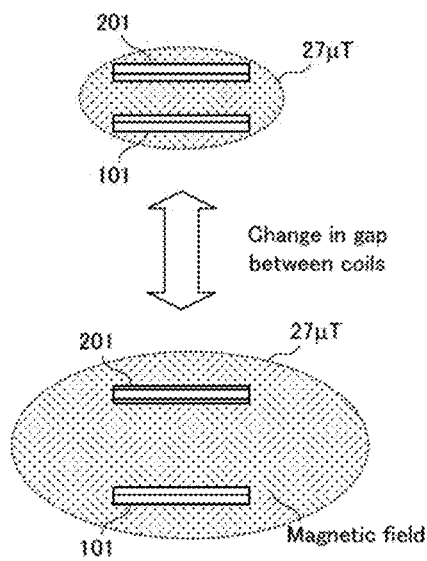
FIG. 17 are conceptual diagrams illustrating one example of a gap or a position shift amount between coils and the magnetic field.
Figure 17B:
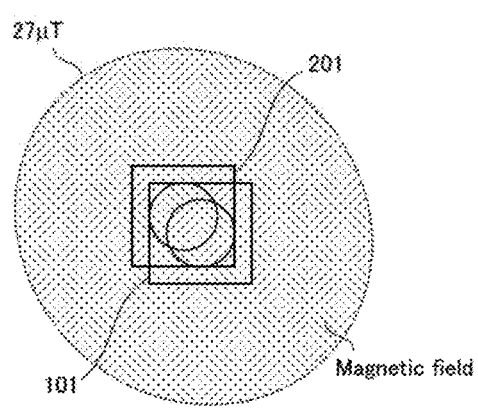

As illustrated in FIG. 17(a), if the gap between the power transmission coil 101 and the power reception coil 201 is small, the leakage range of the magnetic field is narrow, and it is thus possible to set the magnetic flux density at the position of the foreign body detected by the foreign body detection sensor 106 to be less than or equal to the value determined by the radio wave protection guidelines.

Second Example

Figure 19:
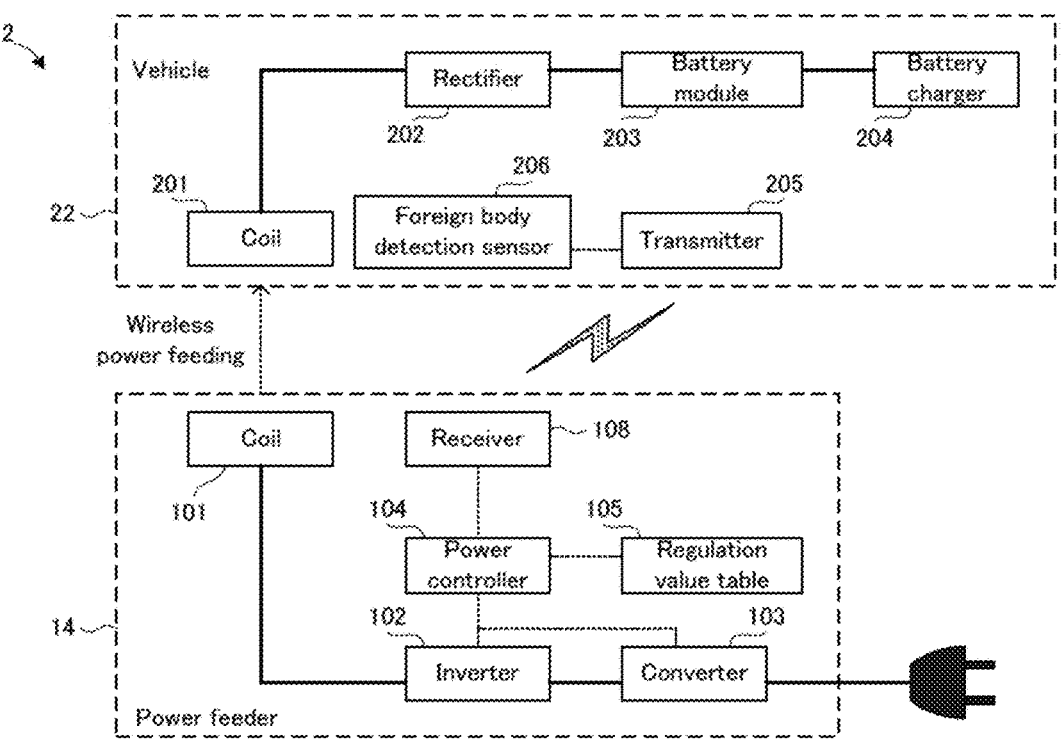
FIG. 19 is a block diagram illustrating a configuration of a power transmission system in a second example.

A second example of the power transmission system of the present invention will be explained with reference to FIG. 19. FIG. 19 is a block diagram illustrating a configuration of the power transmission system in the second example, to the same effect as in FIG. 1.

In FIG. 19, a power transmission system 2 is provided with a power feeder 14 as another example of the "power transmitting apparatus" of the present invention, and a vehicle 22 as another example of the "power receiving apparatus" of the present invention. The power feeder 14 is provided with the power transmission coil 101, the inverter 102, the converter 103, the power controller 104, the regulation value table 105, and a receiver 108.

The vehicle 22 is provided with the power reception coil 201, the rectifier 202, the battery module 203, the battery charger 204, a transmitter 205, and a foreign body detection sensor 206. The foreign body detection sensor 206 can adopt the same various aspects as those of the foreign body detection sensor 106 in the first example described above.

If the foreign body positioned in the surroundings of the power transmission coil 101 and the power reception coil 201 is detected, the foreign body detection sensor 206 detects a relative position of the detected foreign body to the power transmission coil 101 and/or the power reception coil 201. The foreign body detection sensor 206 then transmits a signal indicating the detected relative position to the power feeder via the transmitter 205.

The power controller 104 of the power feeder 14 controls the inverter 102 and the converter 103 to change the electric power supplied to the power transmission coil according to the relative position indicated by the signal received via the receiver 108.

Even if the foreign body is not detected, the foreign body detection sensor 206 may transmit a signal indicating the non-detection of the foreign body to the power feeder 14 via the transmitter 205. The "transmitter 205" and the "receiver 108" in the example are one example of the "transmitting device" and the "receiving device" of the present invention, respectively. The "foreign body detection sensor 206" in the example is another example of the "foreign body detecting device" of the present invention.

The present invention is not limited to the aforementioned embodiment and example, but various changes may be made, if desired, without departing from the essence or spirit of the invention which can be read from the claims and the entire specification. A power transmission system and method, a power transmitting apparatus and a power receiving apparatus which involve such changes are also intended to be within the technical scope of the present invention.

DESCRIPTION OF REFERENCE NUMERALS AND LETTERS

1, 2 power transmission system
11, 12, 13, 14 power feeder
21, 22 vehicle
101 power transmission coil
102 inverter
103 converter
104 power controller
105 regulation value table
106, 206 foreign body detection sensor
107 coil displacement detection sensor
108 receiver
201 power reception coil
202 rectifier
203 battery module
204 battery charger
205 transmitter

The invention claimed is:

1. A power transmitting apparatus comprising a power transmission coil and configured to transmit electric power in a wireless manner to a power receiving apparatus, said power transmitting apparatus comprising:
 a foreign body detecting device configured to detect a foreign body positioned in surroundings of the power transmission coil;
 a coil displacement detecting device configured to detect displacement between the power transmission coil and a power reception coil of the power receiving apparatus; and
 a power controlling device configured to control electric power supplied to the power transmission coil so that a magnetic flux density at a position of the detected foreign body is less than or equal to a predetermined value, on the basis of output of the foreign body detecting device and output of the coil displacement detecting device.

2. The power transmitting apparatus according to claim 1, wherein the power controlling device controls electric power supplied to the power transmission coil on the basis of the output of the foreign body detecting device, while correcting a leaking range of a magnetic field on the basis of the output of the coil displacement detecting device.

3. The power transmitting apparatus according to claim 1, wherein the coil displacement detecting device detects a gap between the power transmission coil and the power reception coil.

4. The power transmitting apparatus according to claim 1, wherein the coil displacement detecting device detects a position shift amount between the power transmission coil and the power reception coil viewed in a planar manner from above the power transmission coil.

5. A power transmitting apparatus comprising a power transmission coil and configured to transmit electric power in a wireless manner to a power receiving apparatus, said power transmitting apparatus comprising:
 a foreign body detecting device configured to detect a foreign body positioned in surroundings of the power transmission coil;
 a gap changing device configured to change a gap between the power transmission coil and the power reception coil; and
 a controlling device configured to control the gap changing device so that a magnetic flux density at a position of the detected foreign body is less than or equal to a predetermined value, on the basis of output of the foreign body detecting device.

\* \* \* \* \*